United States Patent
Ruvolo et al.

(10) Patent No.: US 6,978,246 B1
(45) Date of Patent: Dec. 20, 2005

(54) SYSTEM AND METHOD FOR MATCHING ENTITIES UTILIZING AN ELECTRONIC CALENDARING SYSTEM

(75) Inventors: Joann Ruvolo, San Jose, CA (US); Reiner Kraft, Gilroy, CA (US); Stefan B. Edlund, Sunnyvale, CA (US); Michael Lawrence Emens, San Jose, CA (US); Daniel Alexander Ford, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/556,303

(22) Filed: Apr. 24, 2000

(51) Int. Cl.⁷ ............................................. G06F 17/60
(52) U.S. Cl. ........................................................ 705/8
(58) Field of Search ..................................... 705/8, 9

(56) References Cited

U.S. PATENT DOCUMENTS

| | | | |
|---|---|---|---|
| 4,626,836 A * | 12/1986 | Curtis et al. ................... 283/67 |
| 5,303,145 A * | 4/1994 | Griffin et al. ................ 345/168 |
| 5,558,339 A * | 9/1996 | Perlman ....................... 463/42 |
| 5,664,063 A * | 9/1997 | Johnson et al. .............. 345/963 |
| 5,974,406 A * | 10/1999 | Bisdikian et al. ............... 707/1 |
| 6,073,110 A * | 6/2000 | Rhodes et al. ............... 345/804 |
| 6,098,051 A * | 8/2000 | Lupien et al. ................. 705/30 |
| 6,101,480 A * | 8/2000 | Conmy et al. ............... 345/963 |
| 6,216,110 B1 * | 4/2001 | Silverberg ....................... 705/9 |
| 6,249,282 B1 * | 6/2001 | Sutcliffe et al. ............. 345/751 |
| 6,272,467 B1 * | 8/2001 | Durand et al. ................... 705/1 |
| 6,369,840 B1 * | 4/2002 | Barnett et al. ............... 345/853 |
| 6,389,454 B1 * | 5/2002 | Ralston et al. .............. 709/204 |

OTHER PUBLICATIONS

Higgins, Steve. "Meeting Maker Scheduler Debuts for Mac Platform." PC Week. Mar. 25, 1991. vol. 8. Iss. 12. pp. 45-47.*

Matchup software web site, retrieved from [URL: http://web.archive.org/web/19990220025029/members.aol.com/win4sports/freedoc.html], last modified Aug. 4, 1998.*

* cited by examiner

*Primary Examiner*—Susanna M. Diaz
(74) *Attorney, Agent, or Firm*—Jacasse & Associates; Jaclyn A. Schade; Leonard Guzman (57) ABSTRACT

The present invention provides for an integrated matching service and calendaring system. Calendar events are utilized as a bridge between an electronic calendaring system and a matching service. A calendar event represents an activity, e.g., job opening, tennis match, bicycle race, etc., the requirements to match the activity, the entity attributes, and any match results. An entity defines criteria and information for a matching activity which is stored as a calendar event in the electronic calendar system. Portions of the criteria and information are stored as attachments to the calendar event. The calendar events representing a matching activity and associated attachments are provided to a matching server which locates suitable matches for the activity based upon the criteria and information of the activity. If a suitable match is located, the matching server notifies the entities involved by listing the corresponding entities as attendees associated with the calendar event.

15 Claims, 8 Drawing Sheets

Tempus Fugit
Add Event

When: Date [Sept ▷] [11 ▷] [1999 ▷]
Time [8 AM ▷] [30 mins ▷]
Duration [2 hours ▷] ☐ All day Where: [San Jose - Leland Park High School]

Category [Sports ▷]
Summary [Tennis Match]

What: Detailed

[AddEvent] [Find Match] [Reset]

Tempus Fugit
Find Engineer Position

Requirements

Rate  $45,000  Per Year ▽

Benefits  401K ▭

Industry  Computer ▭

Company Size
(Market Cap)  Small ▭

Engineer Attributes

Experience  2  Years

Skills  ◁ ▷
Enterprise Java Beans
Java server Pages
Java Reflection
Web Design

Find Engineer Position  Reset

*FIG. 7A*

Tempus Fugit
Find Engineer

Requirements

Experience [2-4] Years

Skills
| Enterprise Java Beans |
| Java server Pages |
| Java Reflection |
| Web Design |

Company Attributes

Rate [$50,000] Per [Year ▾]

Benefits [401K ▭]

Industry [Computer ▭]

Company Size [Small ▭]
(Market Cap)

[Find Engineer]   [Reset]

*FIG. 7B*

SYSTEM AND METHOD FOR MATCHING ENTITIES UTILIZING AN ELECTRONIC CALENDARING SYSTEM

BACKGROUND OF THE INVENTION

1. Field of Invention

The present invention relates generally to the field of electronic calendar systems. More specifically, the present invention is related to an integrated matching service and electronic calendar system.

The following definitions may assist in the understanding of terminology used throughout the specification:

calendar component—collections of properties which define a particular calendar semantic.

event—activity or occasion, such as a meeting, an anniversary, a tennis match, etc., in which an entity participates directly, indirectly, or peripherally and is the item or criteria to be matched.

calendar event—a calendar event of the present invention is synonymous with a calendar component, i.e. it includes a to-do, journal entry, etc and may represent an event in the electronic calendaring system.

requirements—a possible attachment to a calendar event which represents the requirements that any entity or separate calendar event must meet in order to be a successful match.

attributes—a possible attachment to a calendar event which represents the profile/preferences of the entity which corresponds to the calendar event.

attendees—property of a calendar event which contains the identity of the entity or entities which have matched the calendar event.

2. Discussion of Prior Art

Electronic calendar systems are a widely used resource in today's society. Electronic calendar systems contain information about events, such as what the event is, when the event will occur, and where it will occur. Attributes about the owner of a calendar, where the owner may be a person, a community organization, or business, are contained in the calendaring systems. Attributes describe the owner and the owner's preferences. Use of calendar systems help an owner manage their time, provide reminders to the owner, and allow an owner to summarize events that occurred on a specified date.

Some calendaring systems additionally provide for a scheduling system. In one example of scheduling, an entity defines a meeting and invites attendees. Traditional scheduling systems then locate free slots for the participants and schedules the meeting. In another example, a service, such as a maid service, uses the calendaring system to schedule their cleaning staff with the houses that need to be cleaned. As can be seen by both of these examples, the scheduling system coordinates the activities between known participants. An originator of the meeting invites specific attendees. There is a prior knowledge of the staff of the maid service and the houses which need to be cleaned.

In addition, there are traditional services, such as dating services, bulletin board services, job placement services, classified ads, etc., that attempt to pair parties with similar interest together. All of these services address pairing parties together, where the parties define some criteria for a successful match. These services may involve just two parties, or involve a facilitator, where the facilitator can play a passive or active role. Varying degrees of automation, e.g., keyword searching of a resume, matching these keywords to job positions, etc., may be implemented in these services.

For the different services, the criteria defined is quite different. For instance, the criteria for a dating service is quite different from the criteria required for job placement services. Due to this fact, when the services are substantially fully automated, the criteria stored in the databases is stored in a format that is efficient with respect to the specific service and limited thereto. For this reason, the particular services only practice one category of pairing (e.g. either job placement or dating), or if a certain service happens to provide more than one category, the categories are separate with separate databases. In addition, the different automated service providers typically utilize proprietary technology to provide the automation, therefore, there is no capability for interconnection of the service providers, i.e., a provider of a dating service cannot be interconnected to a provider job placement services.

While some of the services attempt to pair parties having similar interest, they typically do not provide for pairing parties having similar interest for specific events. Many times an individual may desire to find someone who has a similar interest and who would be able to engage in that interest at a particular time. For instance, one individual may be an intermediate tennis player who desires to play on a specific day and time. However, that individual has no knowledge of others who play tennis and are available at that time. Therefore, the individual would like to seek out someone unknown to them who also plays tennis at an intermediate level and can play at the specified time and date. Traditional pairing services would not be of help to the individual, as they typically could only pair the individual with another individual having an interest in tennis, but cannot guarantee their time schedules would be compatible. Similarly, for two parties wishing to engage in some form of commerce, such as the pairing of customer and service provider, or buyer and seller, is often a random process only slightly facilitated by advertising.

The present invention eliminates the foregoing disadvantages by integrating both the time scheduling capabilities of a calendar system and the efficient matching functions of pairing services in one homogeneous application that is powerful for many users, organizations and types of services. These and other objects are achieved by the detailed description, drawings and claims.

SUMMARY OF THE INVENTION

The present invention provides for an integrated matching service and calendaring system. In addition to the typical items represented by a calendar event, e.g. anniversary, business meeting, to do list, etc., the present invention utilizes a calendar event to represent an activity, e.g., job opening, tennis match, bicycle race, etc., the requirements to match the activity, the entity attributes, and any match results.

An entity defines criteria and information for a matching activity. The information and criteria concerning the activity is represented as a calendar event in a electronic calendaring system. Calendar events representing matching activities and criteria are communicated to a matching server via a calendar access protocol. The matching server then locates suitable matches, if any, and notifies the entities involved of the match.

BRIEF DESCRIPTION OF THE DRAWINGS

FIGS. 6a–7b illustrate screenshots for entering event information.

DESCRIPTION OF THE PREFERRED EMBODIMENTS

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

The Internet Calendaring and Scheduling Core Object Specification (iCalendar) provides a definition of a common format for openly exchanging calendaring and scheduling information across the Internet. The iCalendar specification defines the format of calendar objects, e.g. components, properties. The components are collections of properties which specify an event, a to-do, a journal entry, free/busy time information, time zone information, or an alarm entered into a calendar.

While, the iCalendar specification contains a separate event component, the "calendar event" of the current invention is broadly defined as synonymous with a calendar component, i.e., a calendar event encompasses not only an event, but also includes a to-do, a journal entry, etc. The calendar event of the present invention is utilized as a bridge between electronic calendaring systems and matching services. In addition, event and activity as used herein are synonymous and are the actual items and/or criteria to be matched, e.g. bicycle race, tennis match, job opening, job position, etc. Through the use of the calendar event to represent matching data, i.e. activities, requirements to match the activities, attributes of the entity creating the event, and the results of the match, the present invention provides for a generic matching solution, one in which any matching service (existing or new) is capable of being incorporated into. This presents an efficient manner of providing different categories of matching, and allows for disparate systems utilizing the present invention to be interconnected if so desired.

It should be noted, the iCalendar specification was first presented as RFC 2445 (Request For Comment 2445), and as is typical with RFCs continues to be a work in progress and may change over time. However, it is within the spirit of the present invention to utilize the original iCalendar specification, any subsequent modifications thereof, or any other present of future calendaring format protocols. Additionally, the original iCalendar specification can be located at any RFC archive.

In addition to providing a generic matching service, by integrating a calendar system with a matching service, the capabilities of a calendaring system allow not only matching of similar interests or needs, but provides time-based matching of activities. This not only allows an entity to locate other entities who would be interested in a particular activity, such as a tennis match, but also allows an entity to locate other entities who can participate in the activity at particular times. It can also allow the scheduling of commerce-based activities such as arranging an appointment for a hair cut. This process could also include variable pricing based upon different available time periods. Another advantage of the present invention is correlated to the fact that creating a calendar event is more natural and does not carry the same stigmas associated with it (as opposed to filling out a dating service application, for example). Therefore, entries into the system are more readily made, facilitating the critical mass needed to perform effective matching.

Figure 1A:
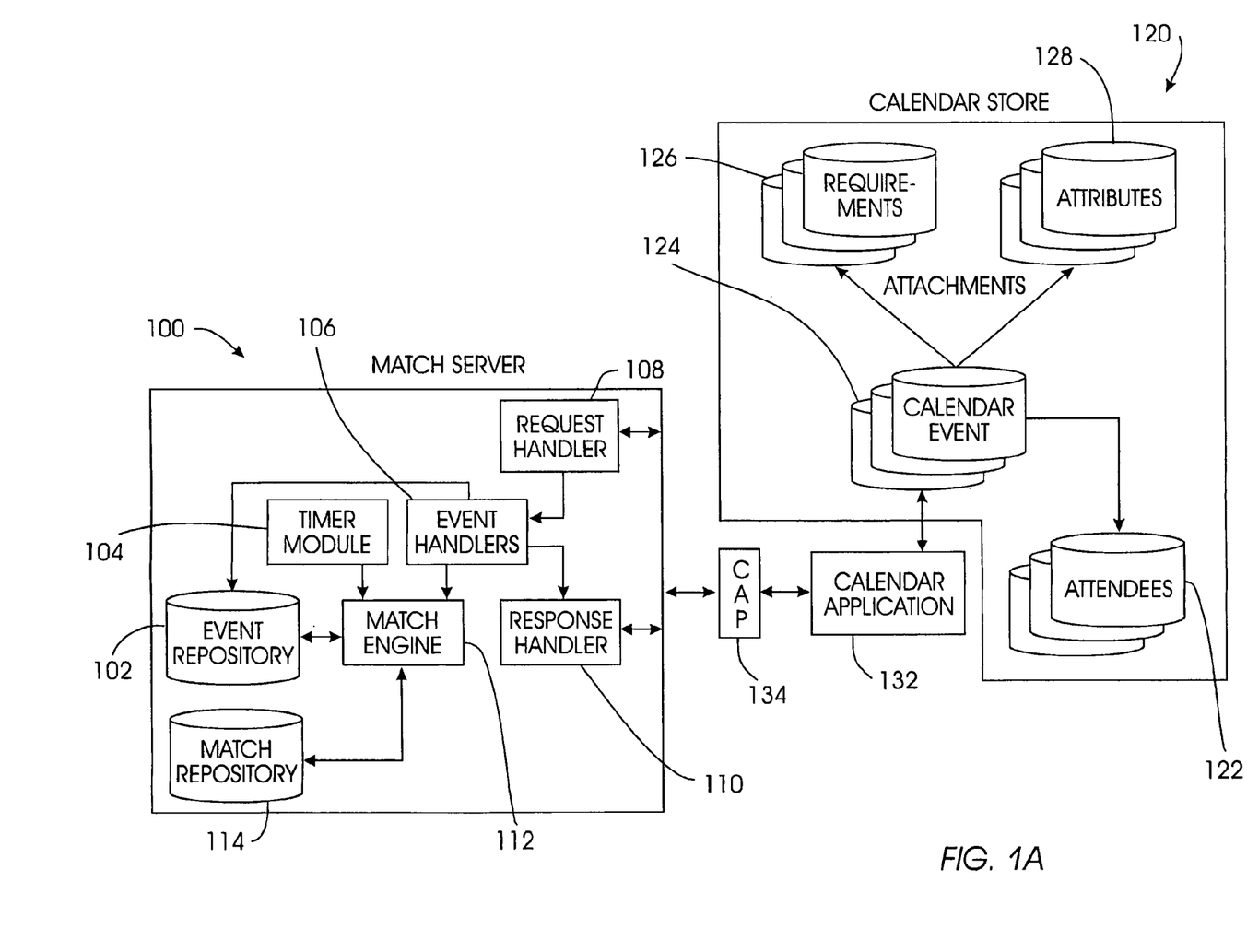
FIG. 1a illustrates the system architecture of an integrated calendar and matching system.

FIG. 1a illustrates the integrated calendaring and matching service architecture of the present invention. Major components of the present invention include "calendar store" 120, "calendar application" 132, "calendar access protocol" 134, and "match server" 100.

Calendar store 120 retains the various properties and calendar components of a single or multiple calendars. In the preferred embodiment of the present invention, the Internet Calendaring and Scheduling Core Object Specification (iCalendar) is utilized to define the format of the calendar objects. As previously described, a calendar event 124, which may be an event, to-do, reminder, etc., is used to represent the matching activity and/or criteria to be matched. In the iCalendar specification, components are capable of having attachments. In the present invention, attachments to the calendar event 124 are used to represent additional information related to the calendar event 124, i.e. requirements 126, attributes 128. Requirements 126 represent the requirements that any entity must meet in order to be a successful match. Attributes 128 represent the profiles/preferences associated with the entity creating the calendar event 124. Additionally associated with a calendar event 124, are the attendees 122. Attendees 122 represent the entities that have matched a particular event.

Calendar application 132 is the electronic calendar system which maintains the calendar store 120. Utilizing calendar application 132, an entity is capable of creating, modifying, or deleting a calendar event 124. Additionally, in conjunction with calendar access protocol 134, calendar application provides for accessing calendar store 120 by match server 100. Calendar access protocol 134 is any suitable protocol for accessing calendar entries.

Match server 100, provides the matching function of the present invention. Match server 100 comprises "request handler" 108, "response handler" 110, "event handlers" 106, "timer module" 104, "match engine" 112, "event repository" 102, and "match repository" 114.

Request handler 108 processes all requested through calendar access protocol 134. Request handler 108 routes requests for calendar event functions to event handlers 106. Event handlers 106 comprise "event registration", "event modification" and "event deletion." Event registration, as further illustrated in FIG. 2, processes all requests by entities which desire to find a suitable match for their activity and/or criteria. Event registration then adds the event to event repository 102 and the entity which created the event is notified via response handler 110 that the event has been registered. A match request is routed to match engine 112 and match engine 112 performs a search of event repository 102 to locate a match for the event. Upon locating a match, the entity creating the event and the entity matching the event are notified via response handler 110.

Figure 3:
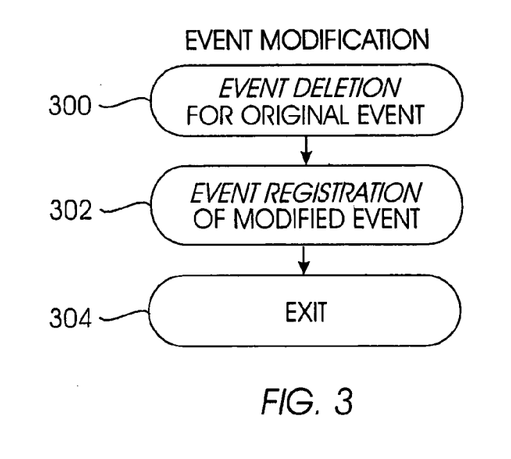
FIG. 3 illustrates the process of modifying a Calendar Event.

Event modification, as further illustrated in FIG. 3, processes all of the requests to update a created event. The event is located in event repository 102 or match repository 114 and is updated. The entity updating the event is then notified via response handler 110 that the event has been modified. The modified event and any previous events which had matched the event prior to modification are then routed to match engine 112 to locate new matches. Upon locating any new matches, the respective owners are notified via response handler 110.

Figure 4:
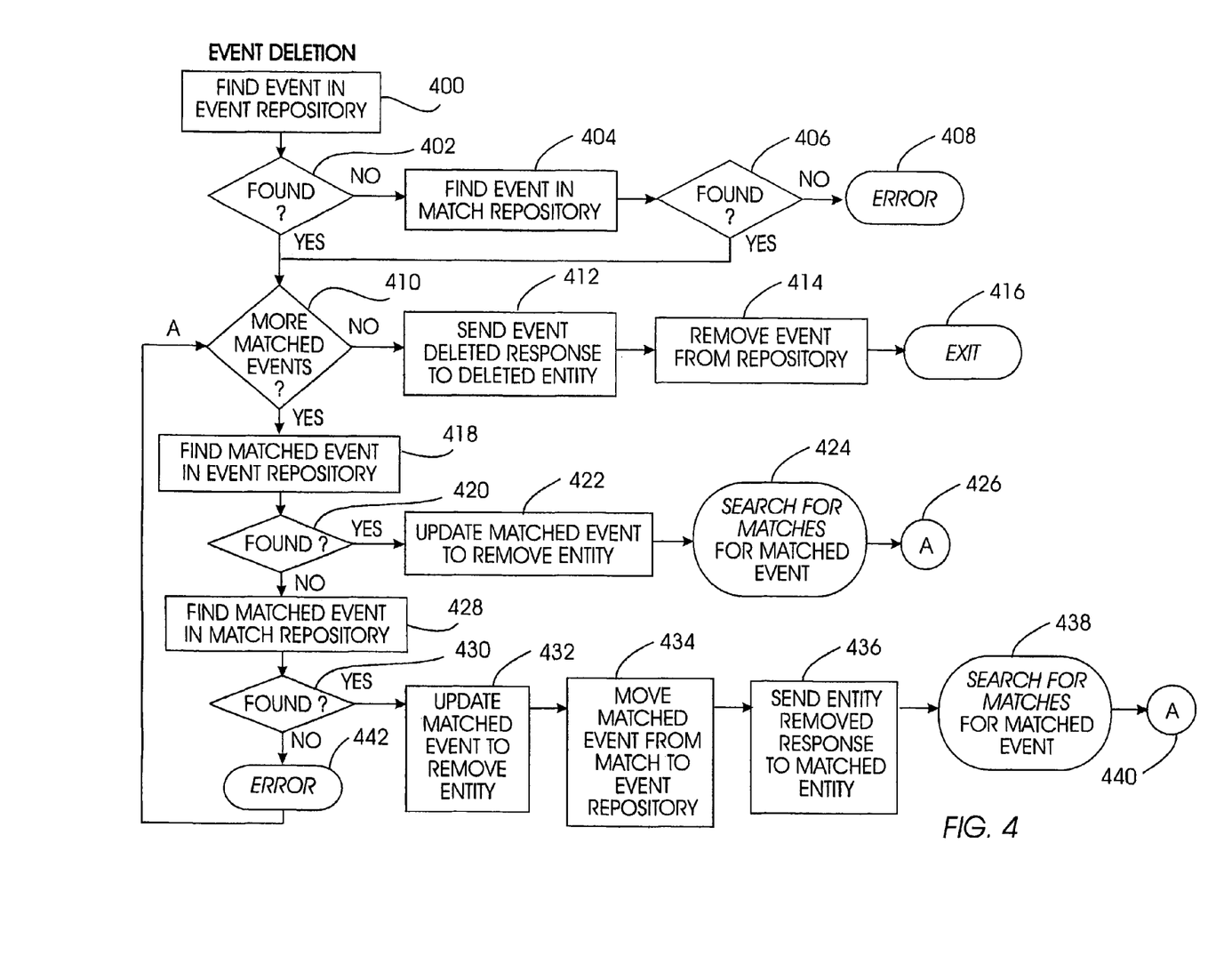
FIG. 4 illustrates the process of deleting a Calendar Event.

Event deletion, as further illustrated in FIG. 4, processes all requests by entities which desire to delete their event. The entity is notified via response handler 110 that the event has been deleted and any matches to the event before deletion are routed to match engine 112 to locate new matches.

Match engine 112 attempts to find a match for the event from events stored within event repository 102. If a match is located which completely satisfies the event, the respective event is moved to match repository 114. It is possible that even though a match is found, the event may not be completely satisfied. For instance, a bicycle club's event for a tour across America might solicit for 50 companions. In this case, an individual entities event is completely satisfied by a match with the bicycle club's event, but, the bicycle club's event is not satisfied until there are 50 matches. The entities event is moved to match repository 114 upon matching with the bicycle club's event, however, the bicycle club's event is not moved to match repository 114 until there are 50 matches. In order to be a successful match, an event must match on specific event criteria, such as what, where and when, e.g. house painting, San Jose, August 23–27. Additionally, there must be a match of requested event requirements with event repository's 102 event attributes. For example, a first entity wants their house painted and first entities requirement is that to have their house painted it costs no more than $100 a room. A second entities rate to paint a room, its attribute, is $80–100. Lastly, there must be a match of requested event attributes with event repository's 102 event requirements. For example, a first entities house to be painted has 7 rooms, its attribute, and the second entities requirement to paint a house is a minimum of 6 rooms.

As previously described, response handler 110 notifies the entity who created the event of various actions with regard to the event. The response handler 110 sends these responses back through the calendar access protocol 134 to the calendar application 132. Timer module 104 is utilized to schedule the matching searches on a regular interval.

Figure 1B:
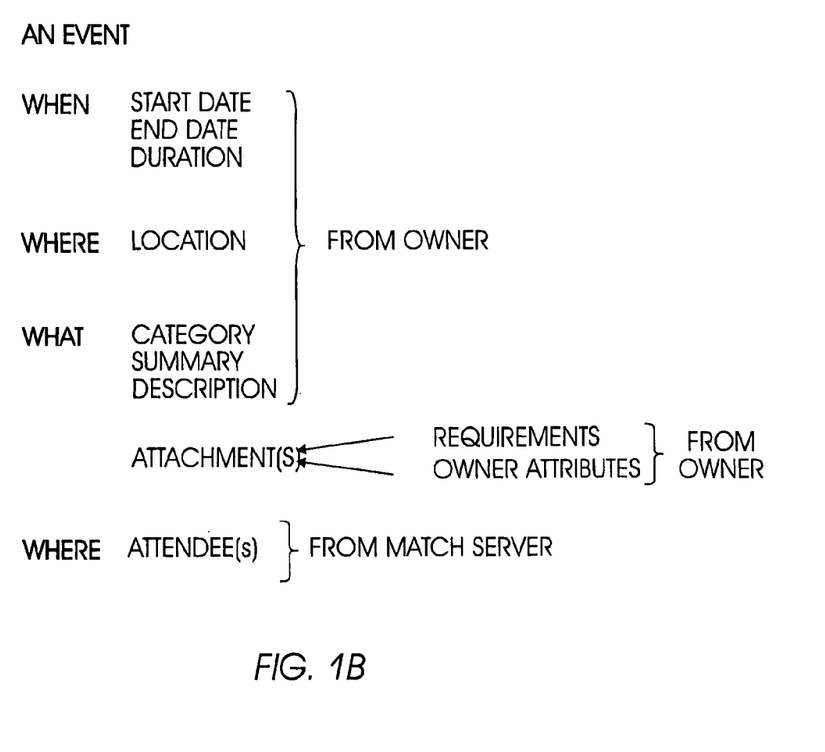
FIG. 1b illustrates information associated with an event.

FIG. 1b illustrates the information typically associated with an event that is represented as a calendar event. Information concerning the event, such as when, where and what, is input into the electronic calendaring system by the owner of the calendar and are represented by calendar event 124. Additionally, requirements 126 and attributes 128 are input by the owner and are associated with calendar event 124 as attachments. Furthermore, the entities or events which match with calendar event 124, requirements 126 and attributes 128 are supplied by match server 100 and are associated with calendar event 124 as attendees.

Figure 2:
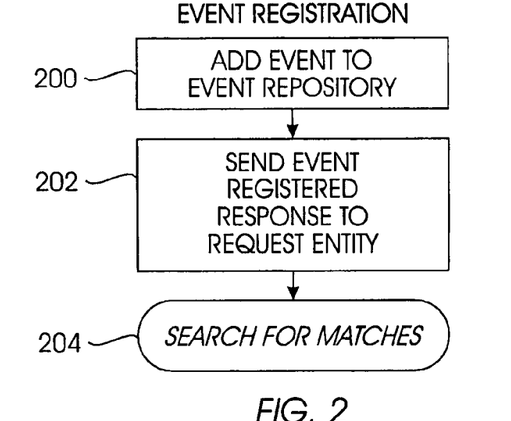
FIG. 2 illustrates the process of registering a Calendar Event.

FIG. 2 illustrates the actions undergone when an event is registered. At step 200, the event is added to event repository 102. Next, a event registered response is then sent to the entity creating the event 202. A search for suitable matches is then performed 204.

FIG. 3 illustrates the steps to modify an event. The original event is first deleted 300. An event registration is then performed for the modified event 302.

FIG. 4 illustrates the steps to delete an event. Event deletion is started by attempting to locate the event in the event repository 400. If not found, a search is made for the event in the match repository 402, 404. If the event can not be located, an error is indicated 408. Once located, a determination of whether or not there are other events already matched to the event to be deleted is made 410. If there are not any other events, an event deleted response is sent to the entity deleting the event and the event is removed from the appropriate repository 412, 414, 416. If there are other matched events to the one being deleted, they are located in the event repository or the match repository 418, 420, 428, 430. If the matched events are located in the event repository, the matched event is modified to remove the entity deleting their event from the matched event and a search is performed to find new matches for the matched event 422, 424. The process is then repeated until all matched events are located 426. If the match is found in the match repository, the matched event is modified to remove the entity deleting the event from the matched event 432, the matched event is moved from the match repository to the event repository. The process is then repeated until all matched events are located 440. If the matched events are not located, then an error is indicated 442 and a determination of whether or not there are any more matched events 410.

Figure 5:
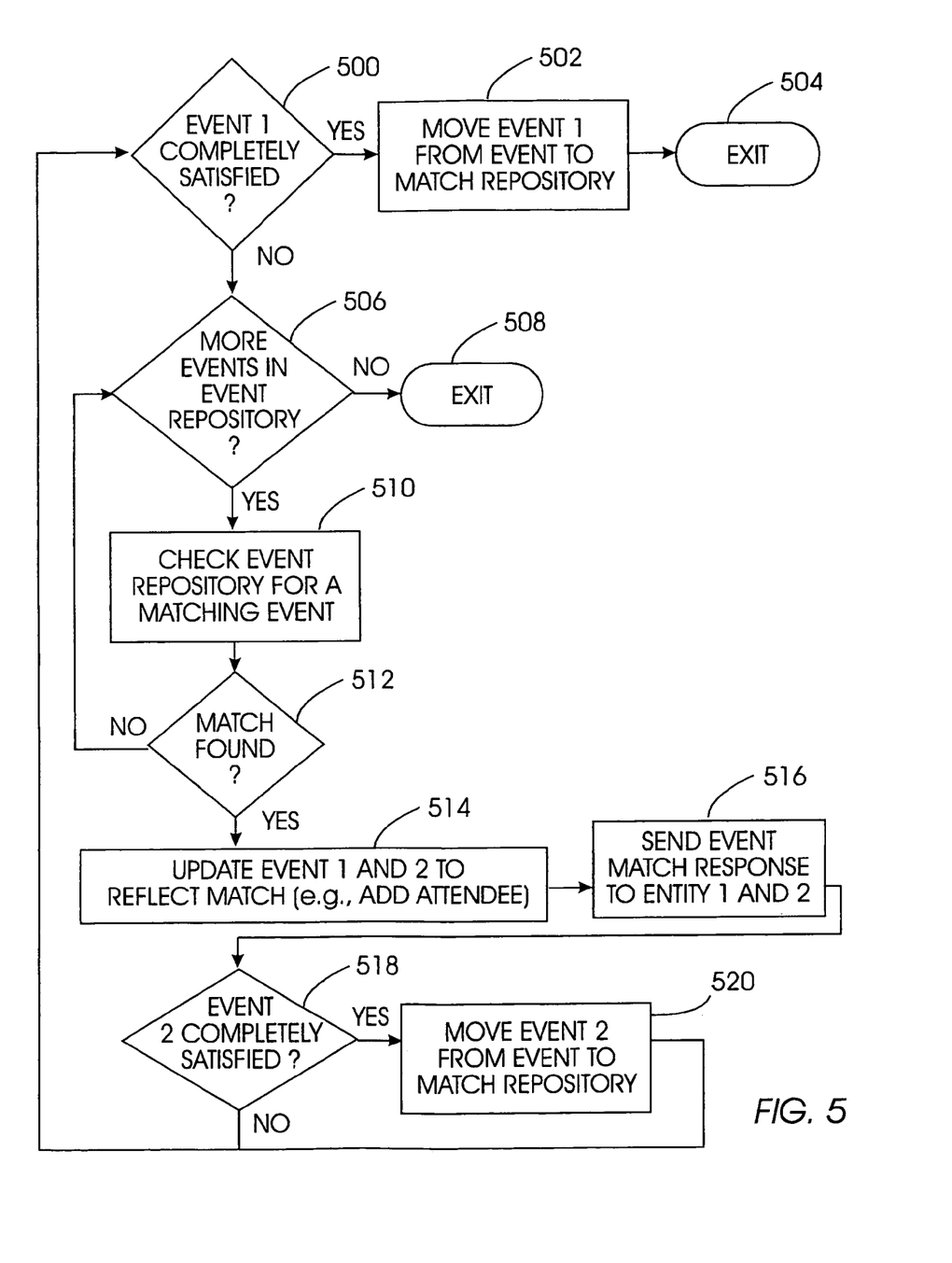
FIG. 5 illustrates the process of searching for matches.

FIG. 5 illustrates the steps to searching for matches. A determination is made of whether or not a first event, event 1, is completely satisfied 500. If event 1 is completely satisfied, it is moved from the event repository to the match repository and the search ends 502, 504. If event 1 is not satisfied, the event repository is checked to determine if there are any more events in the repository. If not, the search ends 508. If there are more events, a search is performed to determine if there is a matching event 510. If a match is not found, the flow moves back to checking the repository for more events 512, 506. If a match is found, event 1 and the matched event, event 2, are updated to reflect the match, e.g. attendees are added, and a match response is sent to the entities informing them a match is found. A determination is made whether or not event 2 is satisfied, and if so, event 2 is moved from the event repository to the match repository. In either case, the flow returns to step 500 where a determination is again made whether or not event 1 is satisfied and the flow continues as described.

The following is an exemplary working of the present invention. An entity creates a calendar event 124 utilizing calendar application 132, such as, bicycle trip; Saturday, Aug. 27, 1999. The entity defines male, age 25–40, average speed 12–17 mph, and any level of difficulty as the Requirements 126 for a suitable match. Attributes 128 of the entity, male, age 31, average speed 15 mph and moderate difficulty, are associated with the calendar event 124. The calendar event is communicated from the calendar store 120 to the match server 100 via calendar application 132 and calendar access protocol 134. Request handler 108 accepts the calendar event and routes it to the event registration handler of the event handlers 106. The event registration handler registers the event and stores it in event repository 102. An acknowledgment is sent, via response handler 110 and calendar application 132, to the entity. The match engine 112 searches the event repository 102 to find a suitable match to the event at specified times indicated by timer module 104. When a match is found for the event, and the event is satisfied, the event is moved from event repository 102 to match repository 114. The event is updated to add the other entity as an attendee of the event and the entities are notified of the match.

Figure 6A:
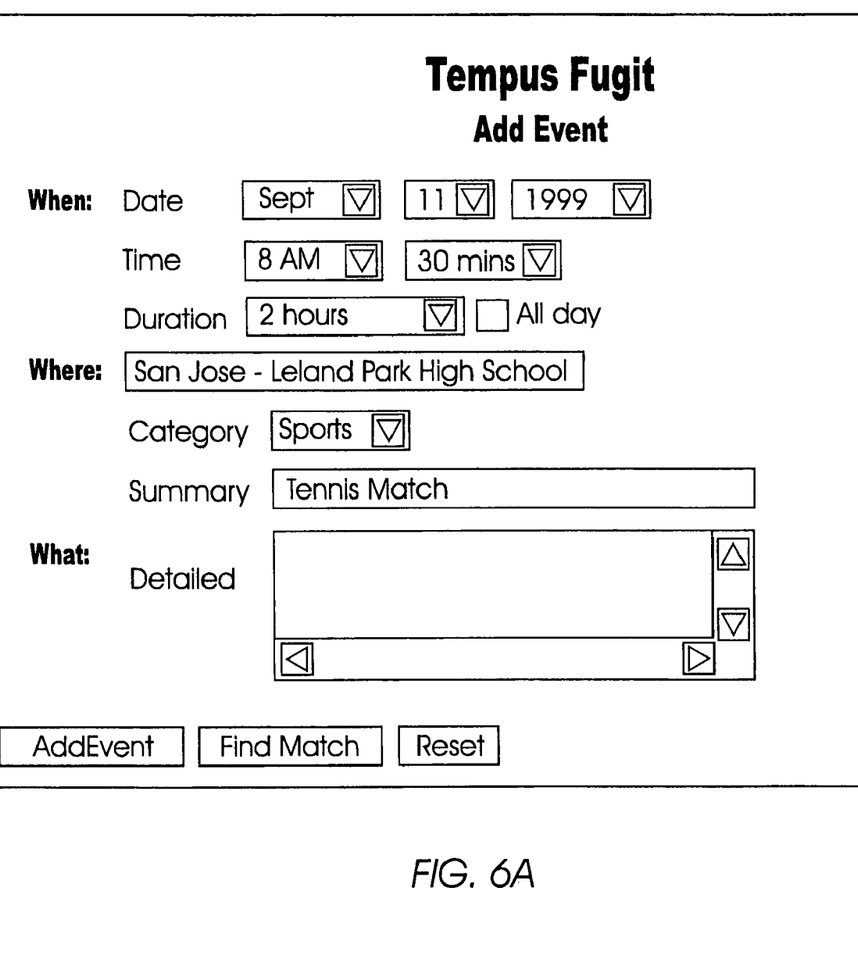

FIGS. 6a–6b and FIGS. 7a–7b illustrate typical screenshots to generate structured entry of activities and/or criteria to be matched. In FIG. 6a, an exemplary screenshot showing the creation of a calendar event for a tennis match is shown. The entity creating the calendar event enters information, such as, when the event will take place, where the event will take place, and what the event is. In addition to this information, attributes of the entity creating the calendar event, and any requirements for a match are associated with the calendar event as attachments.

Figure 6B:
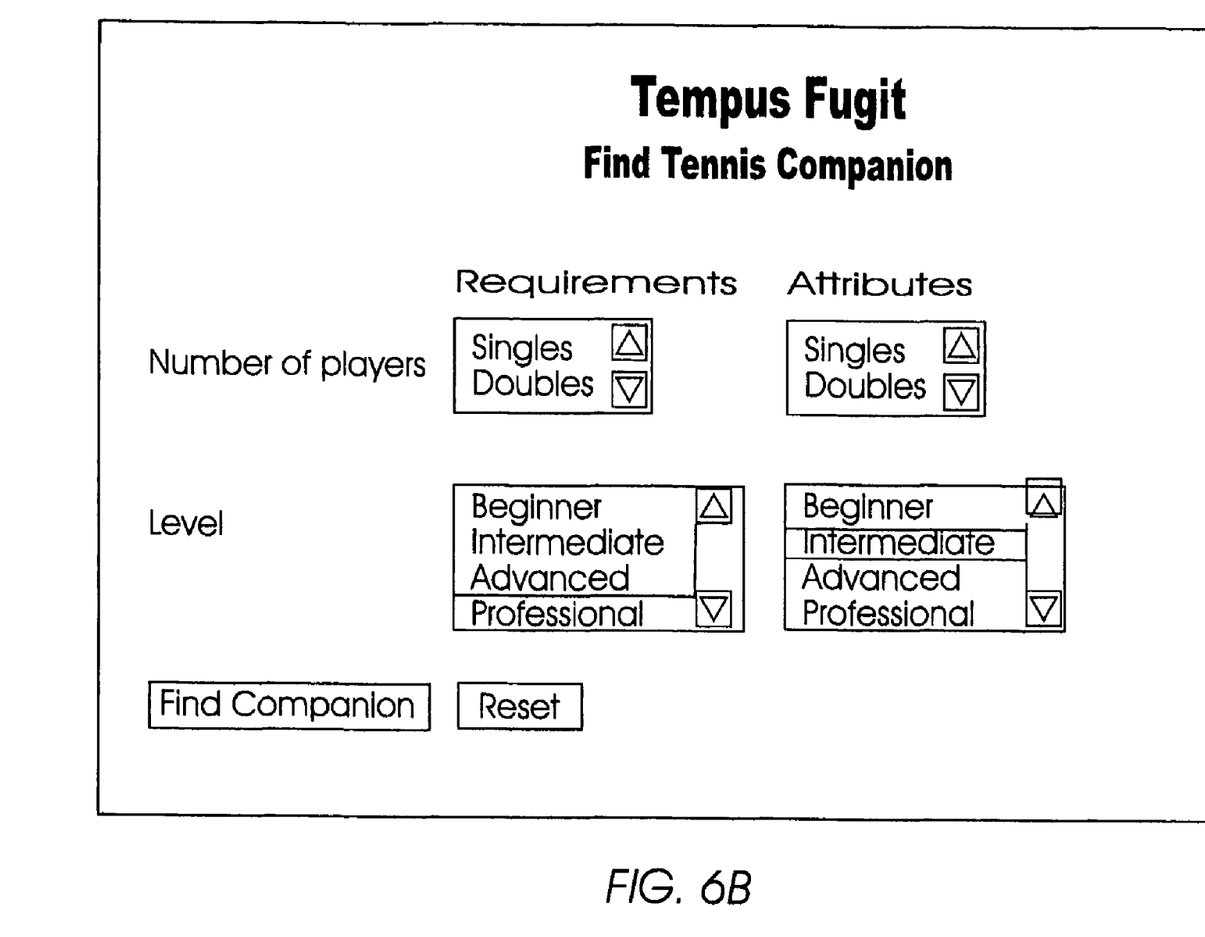

A screenshot for entering criteria to locate an entity of similar interest is shown in FIG. 6b. The entity which wants to find a tennis companion, enters attributes about themselves. In addition, they enter requirements regarding the entity which would be a match. This information is stored as a calendar event, with the attributes and requirements associated as attachments.

Figure 7A:
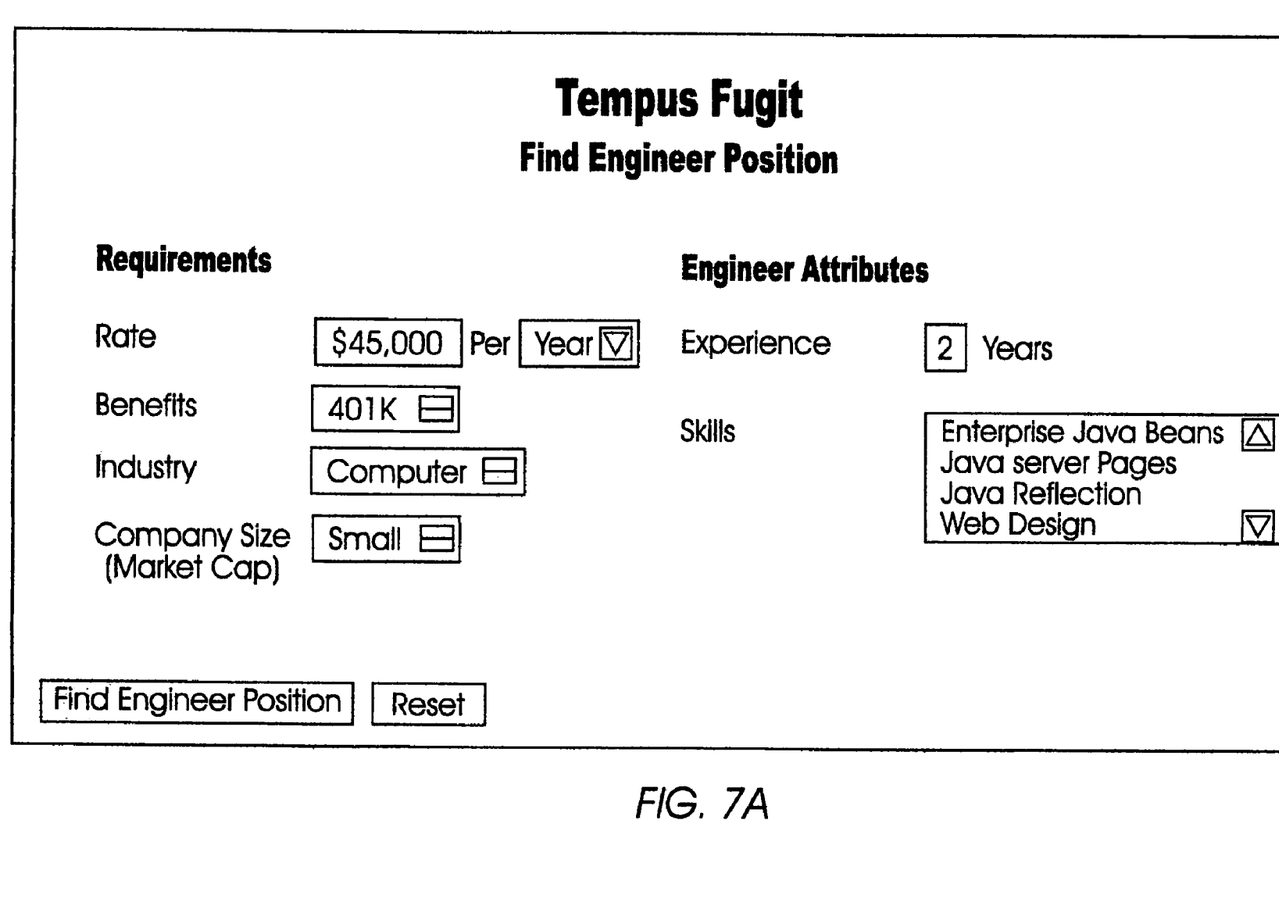
Figure 7B:
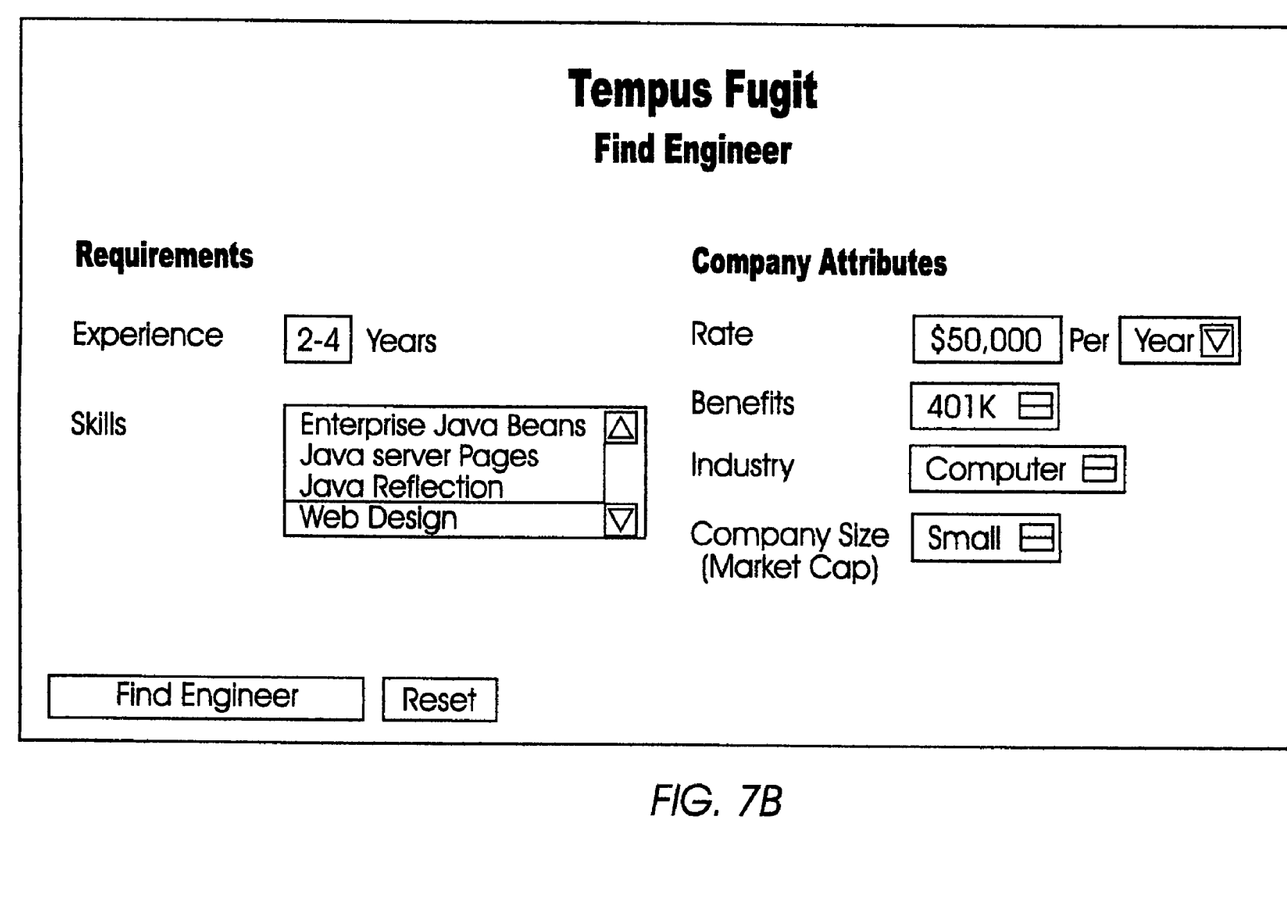

FIGS. 7a and 7b illustrate an exemplary screenshot for the entry of employment information by an employer and potential employee. FIG. 7a shows the entry of requirements, e.g. salary, benefits, etc., of the position sought, and attributes, e.g. experience and skills, of the potential employee entered into the calendaring system by a potential employee. FIG. 7b shows the entry of requirements, e.g. experience and skills, for the position, and attributes, e.g. salary, benefits, etc., of the position entered into the calendaring system by an employer. The input entered by both is stored as separate calendar events. These events are then provided to the match server, which determines if there is a match between the calendar events, and if so, notifies the entities, i.e. employer and potential employee.

The above enhancements for calendar systems and its described functional elements are implemented in various computing environments. For example, the present invention may be implemented on a conventional IBM PC or equivalent, multi-nodal system (e.g. LAN) or networking system (e.g. Internet, WWW). All programming, GUIs, display panels and dialog box templates, and data related thereto are stored in computer memory, static or dynamic, and may be retrieved by the user in any of: conventional computer storage, display (i.e. CRT) and/or hardcopy (i.e. printed) formats.

CONCLUSION

A system and method has been shown in the above embodiments for the implementation of a integrated calendar system and matching. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware and specific calendaring format specifications. In addition, the various elements of the present invention may be located on a single computer system or distributed among multiple systems.

What is claimed is:

1. An electronic calendar event matching system, said system comprising:
   a calendar stored retaining a plurality of calendars and events associated with said calendars,
   a match server operatively connected to said calendar store by an electronic calendar application, said match server comprising:
      a request handler operatively connected to an event handler, said request handler routing requests for calendar event functions to said event handler, said event handler allowing for the registration, modification, or deletion of an event that will occur, said event defined by a particular duration of time;
      an event repository, said event repository cooperating with said event handler to store and update calendar event functions;
      a response handler operatively notifying a requesting first entity that said calendar event has been registered, modified, or deleted, and
      a match engine performing a search of said event repository to locate a match for registered events of said first entity with a registered event of at least one second entity, said match found based on said duration of time, where the event is to occur, event criteria, minimum matching requirements, and attributes of an activity or an entity,
   a timer module for matching events on a regular interval according to a schedule of said timer module, and
   wherein said response handler notifies said first entity and said second entity of said match.

2. An electronic calendar event matching system, as per claim 1, wherein said calendar event functions comprise categories.

3. An electronic calendar event matching system, as per claim 2, wherein said categories comprise at least one of: meetings or activities.

4. An electronic calendar event matching system, as per claim 2, wherein said categories comprise any of a commerce activity, service desired, or service offered.

5. An electronic calendar event matching system, as per claim 4, wherein variable prices or rates are available during a time period for a commerce activity.

6. An electronic calendar event matching system, as per claim 1, wherein said system may be implemented locally or remotely on one or more computer-based systems, across networks or existing communication mediums.

7. An electronic calendar event matching system, as per claim 6, wherein said across networks element comprises any of LANs, WANs, cellular, Internet or Web based networks.

8. A method for determining a match for electronic calendar events, said method comprising:
   registering and storing said calendar events in an event repository of an electronic calendaring system, said calendar event elements comprising: a particular duration of time, specific event criteria, event match requirements, and attributes,
   notifying each event owner that said calendar event is registered,
   searching said event repository to match registered events, said match considering said duration of time of said event that will occur, and matching at least said duration of time and said specific event criteria of said calendar event elements,
   electronically updating said event to reflect a match by adding event owners as attendees, and
   if said event match requirements and attributes are satisfied,
      moving said matched events from an event repository to a match repository and notifying said attendees of said match, else, returning to said searching step until all calendar elements are fully satisfied, said searching said event repository to match registered events is performed on a regular interval, and notifying said attendees of said match.

9. A method for determining a match for electronic calendar events, as per claim 8, wherein said calendar event elements are represented by one or more categories.

10. A method for determining a match for electronic calendar events, as per claim 9, wherein said categories comprise at least one of meetings or activities.

11. A method for determining a match for electronic calendar events, as per claim 8, wherein said method may be implemented locally or remotely on one or more computer-based systems, across networks or existing communication mediums.

12. A method for determining a match for electronic calendar events, as per claim 10, wherein said across networks element comprises any of LANs, WANs, cellular, Internet or Web based networks.

13. A method for determining a match for electronic calendar events, as per claim 8, wherein fully satisfied event matches initiate removing said matched calendar events from said event repository.

14. A method for determining a match for electronic calendar events, as per claim 8, wherein said matches are modified to remove, from the matched event, an attendee who deletes said matched event.

15. An article of manufacture comprising a computer user medium having computer readable program code embodied therein which provides a generic matching service utilizing an electronic calendar system including calendar events comprising:

computer readable program code for registering and storing said calendar events in an event repository, said calendar event elements comprising: a particular duration of time, specific event criteria, event match requirements, and attributes, computer readable program code for notifying each event owner that said calendar event is registered, computer readable program code for searching said event repository to match registered events, said match considering said duration of time of said event that will occur, and matching at least said duration of time and said specific event criteria of said calendar event elements, computer readable program code for updating said event to reflect a match by adding event owners as attendees, computer readable program code to determine if said event match requirements and attributes are fully satisfied, if fully satisfied, said code moving said matched events from an event repository to a match repository and notifying said attendees of said match, else, said code returning to said searching step until all calendar elements are fully satisfied, computer readable program code for searching said event repository to match registered events on a regular interval, and computer readable program code for notifying said attendees of said match.

\* \* \* \* \*